Sept. 15, 1959 H. A. GOTTSCHALL 2,904,614
BATTERY AND METHOD OF MAKING SAME
Filed Nov. 30, 1956

INVENTOR.
HERBERT A. GOTTSCHALL
BY
Leonard H. King
AGENT

United States Patent Office 2,904,614
Patented Sept. 15, 1959

2,904,614

BATTERY AND METHOD OF MAKING SAME

Herbert A. Gottschall, Nutley, N.J.

Application November 30, 1956, Serial No. 625,451

2 Claims. (Cl. 136—133)

This invention relates to multi-cell batteries entirely encapsulated in plastics and in particular to methods of making same involving a minimum of sealing operations.

My U.S. Patent 2,684,397 entitled "Battery and Method of Making Same" describes a procedure for making cells entirely encapsulated in plastic. Batteries could, of course, be assembled from single cells made as there described. There is here described a modified assembly procedure and apparatus for making multicelled batteries which are monolithic in structure and which require fewer conductive plastic end caps and fewer sealing operations than would be involved in assembling complete single cells into batteries. This represents a substantial reduction in overall size and weight. Weight and space requirements are very important in many military applications, particularly for airborne equipment.

Still other objects and advantages of the invention will become apparent as the following description proceeds, taken in conjunction with the drawings.

In the various drawings like numerals refer to like members.

Figure 1:
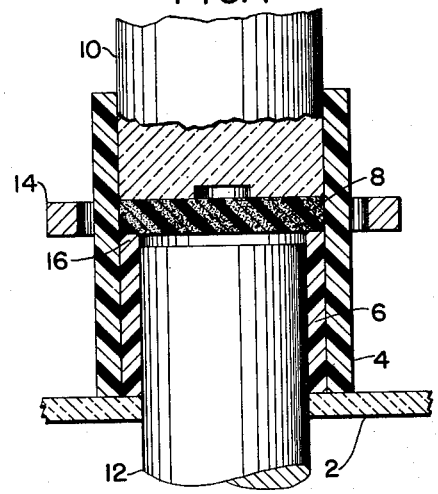
Figure 1 is a cross-sectional view of an induction heating jig together with elements of a battery cell case.

Referring now to the drawings:

In Figure 1 there is shown an asbestos board supporting base 2. Mounted thereon is provided a phenolic resin retaining cylinder 4. Inserted within the retaining cylinder 4 is provided a thermoplastic insulator plastic tube 6 and a thermoplastic conductive plastic cap 8. Upper piston 10 is preferably formed of glass and is positioned against the conductive plastic cap 8, while lower piston 12 is maintained at a level about $\frac{1}{16}$ to $\frac{1}{8}$ inch below the cap.

Figure 2:
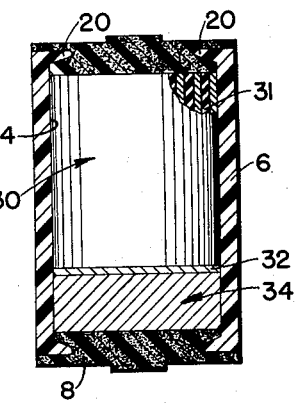
Figure 2 is a cross-sectional view of a complete battery cell.

Upon application of heat generated by means of high frequency electromagnetic energy transmitted by the induction coil 14 to the cap, the cap being formed of a thermoplastic resin, softens. The top region 16 of insulator cylinder 6 is in turn softened by the heat transmitted by conduction from the cap 8. Since piston 12 is spaced away from the cap 8, pressure from piston 10 causes the cylinder in region 16 to deform inwardly while the conductive plastic cap 8 is forced to flow around the deformation to form the interlocking seal 20 shown in Figure 2.

In a typical application, a polystyrene tube $\frac{1}{2}$ inch long and having a $\frac{5}{8}$ inch diameter and a $\frac{1}{10}$ inch wall was sealed to a $\frac{1}{16}$ inch thick conductive thermoplastic disc 10. To form a single cell, the resulting cup 24 was filled with an electrochemical ssytem. A conductive plastic cap was then sealed over the open end of the cup 24, as is disclosed more fully in the referenced patent.

A typical electrochemical system would include, in a battery of the alkaline mercury-zinc type, an anode 30 consisting of a roll of amalgamated zinc foil 31 interwound with a strip of porous material saturated with electrolyte and a porous separating disc 32 to separate the anode from the cathode material 34.

Figure 3:
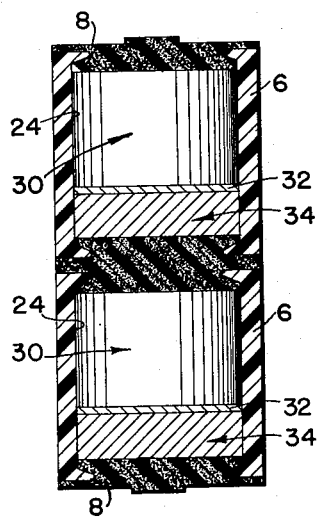
Figure 3 is a cross-sectional view of a multi-cell battery of this invention.

In Figure 3 there is shown a multi-cell battery of this invention. Although a two-cell battery is illustrated, it should be understood that the invention may be applied in a similar manner to batteries having a greater number of cells.

In assembling a multi-cell battery of this invention, a cup 24 is formed as described above. The cup 24 is then charged with a suitable electrochemical system 36. A conductive plastic cap 8 is then positioned over the filled cup 24 together with an insulating plastic cylinder 6; retaining cylinder 4 serves to align the various members. Coil 14 is positioned around the cap 8.

Figure 4:
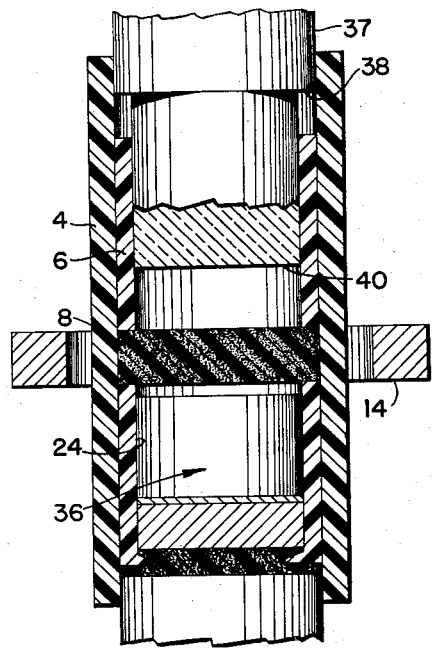
Figure 4 shows in cross-section a partially assembled multi-cell battery.

In contrast to the method of forming the cup 24 succeeding cups must be formed with their open end up; therefore a plunger 37 shown in Figure 4 is employed. This plunger 37 has two active pressure surfaces 38 and 40 respectively. The shoulder 38 acts on the top end of the cylinder 6 and forces it downward into the cap 8 during the heating cycle. The bottom 40 of the plunger 37 applies pressure to the portion of the cap inside the cylinder. The distance between these pressure surfaces, the shoulder 38 and the plunger bottom 40, determines the structure of the closure regions of both cells, the depth of the cup and the amount of cap flow into the cell being completed. The closure region structure determines the physical strength and liquid tightness of the bond. Cup depth affects both sealability and internal resistance of the cell. If the cup is too shallow the electrolyte wets the bonding region during the assembling and prevents union. If the cup is too deep there will be insufficient pressure on the chemical system and contact resistance will be excessive. The presently preferred distance between the bottom the plunger and the shoulder has been determined empirically by placing circular shims of various thicknesses on the plunger shoulder. It has been found that the most satisfactory results have been obtained with a cap thickness of 0.060 inch and cylinder height of 0.550 inch when the dimension between the plunger shoulder and bottom is $0.499 \pm 0.003$ inch.

As each cell closure in the stack is processed the work table is lowered to locate the closure region of the next cell in the desired position with respect to the induction coil 14. Having thus disclosed the currently best mode contemplated for carrying out my invention it is to be understood that various modifications may be made by those skilled in the art without departing from the spirit of the invention.

What is claimed is:

1. A multi-cell battery of at least two adjacent electrochemical cells, each cell comprising a tubular section of insulator plastic having at each end thereof a conductive plastic cap joined to said insulator plastic tubular section by an interlocking joint, said joint being characterized by an annular groove in said conductive cap, said groove being filled by a deformed portion of said insulator plastic tubular section, adjacent pairs of cells being joined by individual interlocking joints to a common conductive plastic cap, and an electrochemical system in each of said cells, positioned between said conductive plastic caps of the cell.

2. The method of making a multi-cell stacked battery assembly from a plurality of individual hollow cylindrical insulator plastic members and a plurality of conductive plastic cap members comprising the steps of forming an open-ended cup by simultaneously deforming one end of one of said plurality of insulator plastic members and one of said conductive plastic cap members by means of heat and pressure to form an interlocking joint therebetween; introducing an electro-chemical system into said open-ended cup; forming successive open-ended cups integral with a preceding said open-ended cup so that each said successive open-ended cup serves to close a said preceding cup, each of said successive open-ended cups being made by positioning another said conductive plastic cap member on the open end of a said preceding cup containing an electrochemical system, positioning another said insulator plastic cylinder on said conductive plastic cap member covering said preceding cup, applying sufficient heat and pressure to said cap member, said preceding cup and said insulator cylinder to form individual interlocking joints therebetween common to the same cap member, and sealing a conductive plastic cap member to the last said successive open-ended cup member, containing an electrochemical system, by applying sufficient heat and pressure to form an interlocking joint therebetween.

References Cited in the file of this patent

UNITED STATES PATENTS

| | | |
|---|---|---|
| 1,587,356 | Riebeth | June 1, 1926 |
| 2,411,272 | Keller | Nov. 19, 1946 |
| 2,684,397 | Gottschall | July 20, 1954 |

FOREIGN PATENTS

| | | |
|---|---|---|
| 389,754 | Great Britain | Mar. 23, 1933 |